April 19, 1932. A. HUPP 1,854,794
ANTIVIBRATION SUPPORT FOR VEHICLE BODIES
Filed Jan. 20, 1927  4 Sheets-Sheet 1
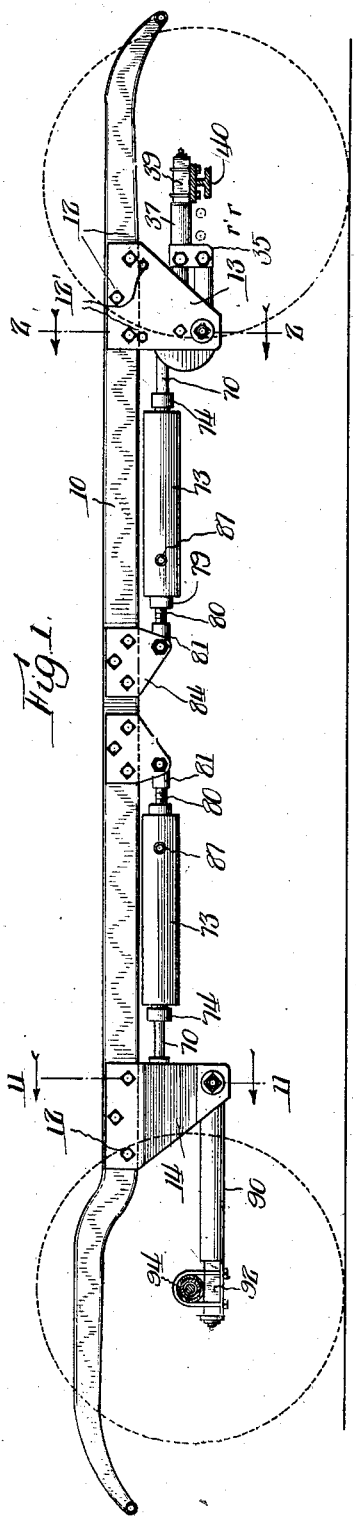
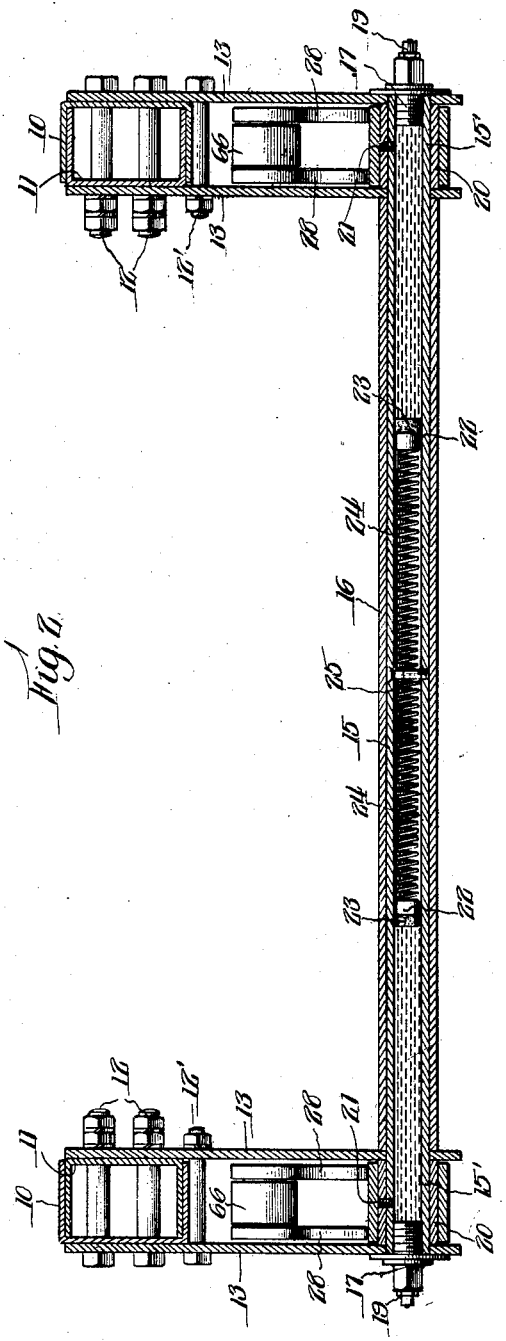
Inventor:
Albert Hupp,
By Fisher, Towle, Clapp + Soans
Attys.

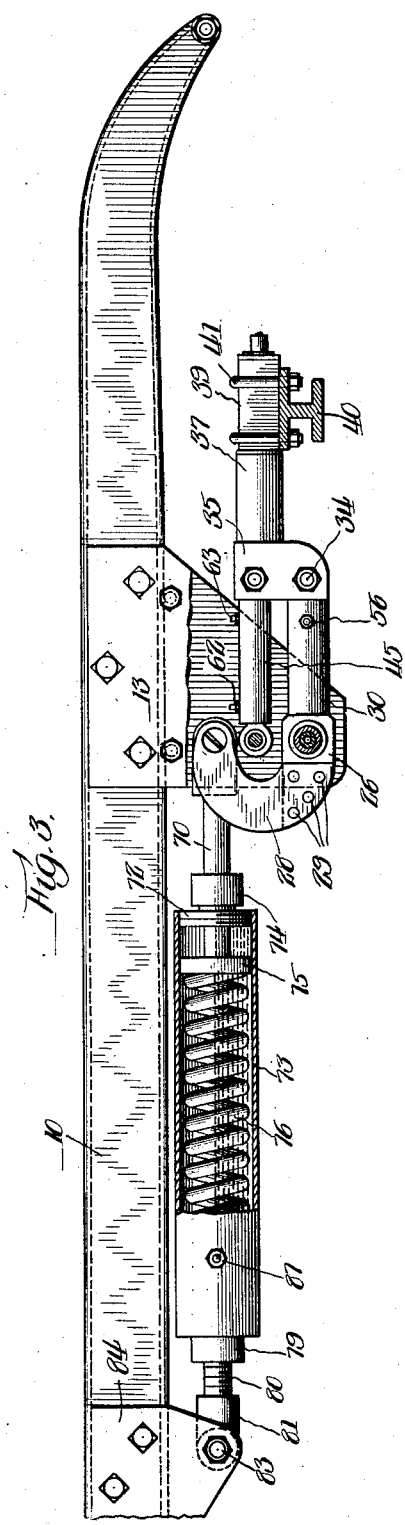

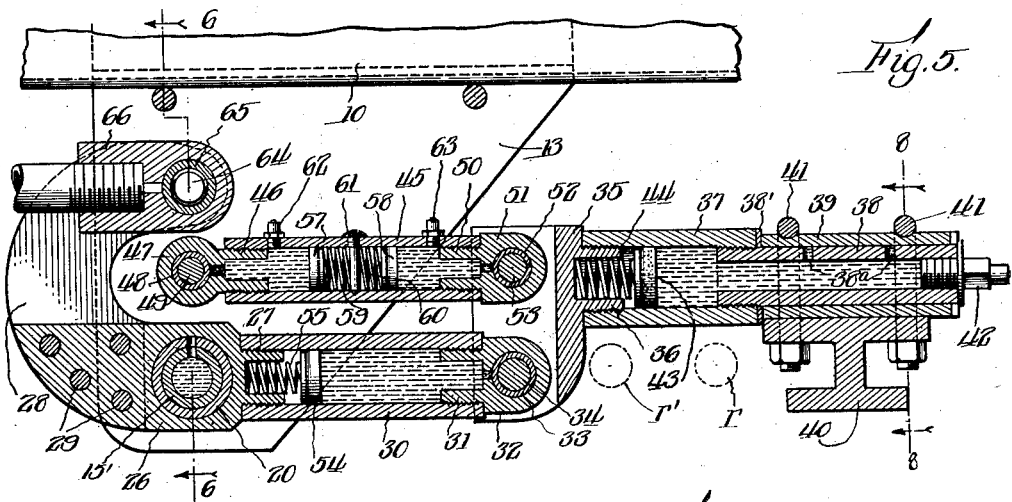

April 19, 1932. A. HUPP 1,854,794
ANTIVIBRATION SUPPORT FOR VEHICLE BODIES
Filed Jan. 20, 1927 4 Sheets-Sheet 4
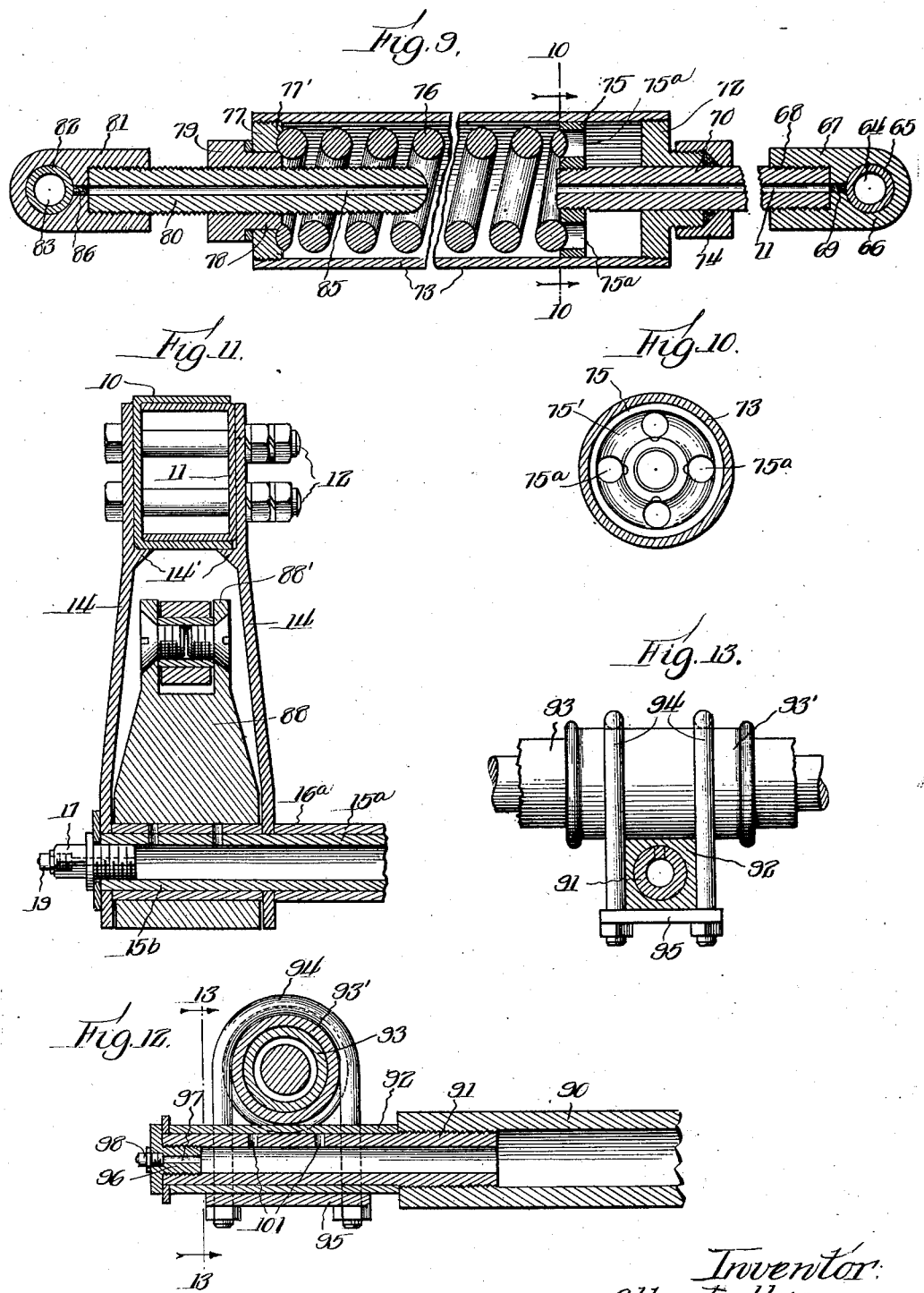

Patented Apr. 19, 1932

1,854,794

UNITED STATES PATENT OFFICE

ALBERT HUPP, OF CHICAGO, ILLINOIS

ANTIVIBRATION SUPPORT FOR VEHICLE BODIES

Application filed January 20, 1927. Serial No. 162,236.

This invention relates to antivibration or cushioning devices for supporting a vehicle body on its running gear, and is intended more particularly for use on automobiles and other motor vehicles. The present invention belongs to the same general type of spring support as that shown in my former Patent No. 1,367,660, granted February 8, 1921, and is in the nature of an improvement on the device of said patent.

In the type of support on which the present invention is based there are employed on each side of the car a pair (front and rear) of bell-crank lever that are fulcrumed at their elbows on brackets attached to and depending from the longitudinal side bars of the chassis frame. The forwardly and rearwardly extending arms of said levers are supported on or from the front and rear axles, while their upwardly extending arms act against heavy compression or tensile springs also mounted on and parallel or approximately parallel with said side bars. Under this arrangement, the thrusts caused by the relative upward movements of the axles toward the car body act in directions substantially parallel with the car body in the horizontal planes of the lever fulcrums and the spring abutments or anchors, instead of vertically as in the standard automobile spring, and these horizontal thrusts, since they act in opposite directions and in different planes, tend to cause a fore and aft rocking or tilting movement of the car body instead of a direct up and down vertical vibrating or bouncing movement. The force of the thrusts being multiplied through leverage, the springs being much heavier than when required to sustain merely the maximum load of the car, and the extent of movement of compression or extension being correspondingly reduced, there follows a more nearly complete absorption of the shocks and jars caused by rough roads and greatly improved riding qualities on much the same principle that, the roughness of the roadway being constant, a heavy load supported on heavy springs will travel more smoothly than a light load carried on light springs.

Notwithstanding the theoretical advantages of a spring support of this type, it has never, so far as I am aware, gone into actual use on carriages, automobiles, or other classes of vehicles; and the main reason for this I believe lies in the fact that devices of this type heretofore proposed have failed to take into account and to provide for all of the conditions met with in actual service, such as side tilting of the car body, vertical movement of the individual wheels and axle ends in encountering local elevations and depressions in the roadway, the tilting or rocking tendencies imparted to the axles, adequate lubrication of the pivotal joints, the best utilization of available space, the avoidance of interference with the steering and brake rods, and adaptability to application of standard makes and types of automobiles, and many other details of actual practice.

It has been the general object of the present invention to provide a spring support mechanism of the general type above described which will satisfactorily meet all of the practical service conditions above mentioned, and will thus render this type of spring support practical and useful and capable of efficient service and adaptability to the severest road conditions encountered in actual use.

Other more specific objects and advantages of the invention will be apparent to persons skilled in the art as the same becomes better understood by reference to the following detailed description, taken in connection with the accompanying drawings in which I have illustrated one practical and serviceable embodiment of the invention, and wherein—

Fig. 1 is a side elevation of an automobile chassis equipped with my improved antivibration support;

Fig. 2 is an enlarged vertical transverse section on the line 2—2 of Fig. 1;

Fig. 3 is an enlarged side elevation, partly in section, of the forward portion of the chassis frame and the front axle, showing one of the forward supporting mechanisms;

Fig. 4 is a similar view of the rear portion of the chassis frame and rear axle showing one of the rear supporting mechanisms;

Fig. 5 is an enlarged view in vertical longitudinal section of one of the forward supporting devices;

Fig. 6 is a vertical transverse section on the line 6—6 of Fig. 5;

Fig. 7 is a view similar to Fig. 6, showing a simplified form of lever fulcrum that omits the strut rod or brace appearing in Figs. 2 and 6;

Fig. 8 is a sectional detail on the line 8—8 of Fig. 5;

Fig. 9 is an enlarged vertical longitudinal section, broken out between its ends, of the thrust spring, its housing, and end connections;

Fig. 10 is a sectional detail on the line 10—10 of Fig. 9;

Fig. 11 is an enlarged vertical transverse section on the line 11—11 of Fig. 1;

Fig. 12 is a view in vertical longitudinal section of the device for connecting the rear levers to the rear axle housing;

Fig. 13 is a vertical transverse section on the line 13—13 of Fig. 12.

Referring to the drawings, 10 designates a standard form of chassis side frame bar which is of the channel form shown in Fig. 2. At points some distance inwardly from the front and rear ends of the frame bar the latter is supplied with filler blocks 11, preferably taking the form of reversely facing channels tightly interfitting the channels 10; and to the front side of the frame bar and the rear sides of the filler blocks are attached, as by through bolts 12, depending bracket plates, of which the forward plates are designated by 13 and the rear plates by 14. In the case of the forward pairs of bracket plates, fore and aft stresses are further resisted by a pair of spaced through bolts 12' that lie in contact with the lower side of the frame bar 10, as clearly shown in Fig. 6. The lower ends of each front and rear pairs of bracket plates are apertured to receive the end portions 15' of a tubular cross-bar 15 best shown in Fig. 2. Encircling the cross-bar 15 is a spacing sleeve 16, the ends of which abut against the inner plates 13, said sleeve thus forming a transverse strut between the two brackets. The end portions 15' of the cross-bar constitute fulcrum bearings for the elbow levers hereinafter described, and said end portions are tapped at their outer ends to receive flanged plugs 17 bearing against the outer plates 13 and locking the cross-bar 15 in place; the plugs themselves being formed with longitudinal oil or grease ducts 18 closed by removable caps 19, through which ducts oil or grease may be supplied to the interior of the cross-bar 15 by a grease gun. Encircling the end portions 15' are bushings 20 tightly clamped endwise between each pair of bracket plates, and the end portions 15' and bushings 20 are radially ported as shown at 21 to permit the lubricant to work to the outer surface of the bearing; and to maintain a constant supply of grease to the bearings, the interior of the bar 15 is equipped with a pair of plungers 22, supplied with leather washers 23, and backed by thrust springs 24 that are footed against a central bolt 25 passed through the bar 15.

Referring to Figs. 3, 5 and 6, which best illustrate the details of the forward supports, journaled on each of the forward bearings 15' is a steel forging 26 formed at its forward end with an externally threaded hollow boss 27, while the sides of the portion thereof in rear of the bearing 15' are countersunk to receive the lower ends of a pair of upwardly extending curved plates 28, the latter being rigidly attached to the forging 26 as by machine screws 29. Screwed onto the boss 27 is a steel tube 30, the forward end of which is tapped to receive a rearwardly extending hollow boss 31 formed on a bearing member 32 that is journaled, through an interposed bushing 33, on a pivot bolt 34 extending through the lower portion of a vertically channelled forging 35. On the upper portion of the forward side of the member 35 is an externally threaded hollow boss 36, on which is screwed a tubular member 37 that forms in effect the stem or shank of a hollow trunnion 38; the trunnion being screwed into the tubular member 37 and provided with a flange 38' abutting against the end of member 37 to afford a strong and rigid joint against bending. The trunnion 38 has a bearing in a square block 39 (Fig. 8) that rests upon the front axle 40 and is secured to the latter as by U-bolts 41. The trunnion 38 is locked in its bearing by a flanged plug 42, similar to the plug 17, on its forward end, adapted to take the nozzle of a grease gun for charging the trunnion and tube 37 with lubricant, and this latter is automatically fed to the trunnion bearing through radial ports 38ª by a plunger 43 in the tube 37 backed by a thrust spring 44 centered in the boss 36.

The tube 30 and its connections to the lever fulcrum 15' and the pivot bolt 34 constitute the tension member of the horizontal lever arm; and the compression member of said arm is generally similar structurally to the tension member, comprising preferably a tube 45 tapped at one end to receive an annular boss 46 on a bearing member 47 that is journaled, through a bushing sleeve 48, on a pivot stud 49 rigidly secured in and between the bracket plates 13, the axis of the pivot stud 49 being located in the vertical plane of the axis of the fulcrum bearing 15'. The other end of the tube 45 is similarly tapped to receive an annular boss 50 on a bearing member 51 that is journaled, through an interposed bushing sleeve 52, on a pivot stud 53 extending through the upper portion of the vertically channelled forging 35; the axis of the pivot stud 53 being in the vertical plane of the axis of the underlying pivot stud 34.

The tension and compression members of the horizontal lever arm last described are preferably equipped with self-lubricating means, as follows. Within the tubular member 30 is a plunger 54 backed by a thrust spring 55 seated and centered in the hollow boss 27, the plunger 54 acting to maintain continuous lubrication of the pivot stud 34 through pressure on a body of grease which may be introduced into the tube by a grease gun through a lateral supply duct 56 (Fig. 3). The bearing studs 49 and 53 of the upper tubular arm 45 are similarly lubricated automatically by means of a pair of oppositely facing plungers 57 and 58 backed by thrust springs 59 and 60 that are footed on a bolt 61 extending through the tube 45 at the center thereof. Grease supply ducts 62 and 63 (Fig. 3) in the tube 45 permit the charging of the two end portions of the tube with grease in the same manner as the supply duct 56.

The relatively short upwardly extending arm of each of the forward elbow levers preferably takes the curved form shown in order to bring its upper end vertically above the bearings 15' and 49; and in the overhanging end of the plates 28 forming this arm is rigidly secured a pivot bearing for the thrust link of the main spring. This pivot bearing preferably takes the structural form illustrated in Fig. 6, wherein it will be seen that a pair of cap screws 64 passing through registering holes in the lever arms 28 are screwed into opposite ends of a tapped bushing sleeve 65 that fits between the plates 28. On the bushing sleeve 65 is journaled a bearing member 66 (Fig. 9) having a rearward extension 67 formed with a tapped socket 68 and with an oil duct 69 connecting the bottom of said socket with the surface of the bearing sleeve 65. Screwed into the socket 68 is a plunger rod 70 formed with an axial oil duct 71 that registers with the oil duct 69. The plunger rod 70 is slidably mounted in the head 72 of a spring cylinder 73, and is packed by a stuffing box 74. The end of the plunger rod 70 is connected to a plunger 75 slidably mounted in the cylinder 73, and said plunger is backed by a heavy coil compression spring 76 housed within the cylinder 73, the other end of said spring being footed against a cylinder head 77 secured within the rear end of the cylinder 73. Rotatably mounted in the head 77 is the stem 78 of an adjusting nut 79 that is mounted on a threaded adjusting rod 80 that extends into the cylinder 73. The rear end of rod 80 is screwed into a bearing member 81 that is swiveled, through a bushing sleeve 82, on a pivot stud 83 rigidly mounted in and between a pair of depending bracket plates 84 (Fig. 3) attached to the frame bar 10 in the same manner as the bracket plates 13. The adjusting rod 80 has an axial oil duct 85 registering with an oil duct 86 in the bearing member 81. The ends of the spring 76 rest in annular seats 75' and 77' in the plunger 75 and cylinder head 77, and the plunger is formed with holes 75ª for the passage of lubricant therethrough. The portion of the spring cylinder within which the spring is housed is packed with oil or grease through an alemite opening 87 (Fig. 3) and this works through the ducts 71, 69 and 85, 86 to the pivot bearings 64 and 83. By turning the nut 79, the thrust spring 76 can be properly tensioned according to the weight and loading of the vehicle; and in practice the spring is so tensioned that in a loaded condition of the vehicle the fulcrum of the elbow levers will lie substantially in or slightly below the horizontal plane of the axle.

From the foregoing it will be seen that the weight of the forward portion of the vehicle and its load is applied to the lever system at the fulcrum 15'. This weight is transmitted through the horizontal lever arm to the front axle 40, and the tendency of the load is to elevate the forward end of the arm relatively to its fulcrum and thus swing the vertically disposed arm 28 rearwardly or to the left, viewing Figs. 1 and 3. This tendency of the vertical lever arm is powerfully resisted by the spring 76 acting through the plunger 75, plunger rod 70 and bearing member 66. The combined action of the tension and compression members 30 and 45 of the horizontal arm is to render said arm inflexible in a vertical direction, and the employment of spaced tension and compression members affords an arm of great strength to resist breaking strains. Another important advantage of this construction is to prevent the transmission of any sidewise tilting or rocking movement to the front axle 40 during the rising and falling movements of the latter relatively to the car body. Since the pivot bearings of the two members of the arm are equi-distant from center to center, and the centers of the rear bearings 15' and 49 are in a vertical plane, the swinging movements of the centers of the bearings 34 and 53 are in arcs of equal radii, so that in all positions of swing of the arm as a whole, the axes of the bearings 34 and 53 lie in a common vertical plane. This means that no tilting or rocking movement is transmitted to the forward section 37 of the arm or to its trunnion 38, but the latter rises and falls through positions always parallel with each other, so that the axle 40 may rise and fall, due to elevations and depressions in the road, without any sidewise rocking or tilting movement on its longitudinal axis or on the axis of the front wheels being imparted thereto.

The connection of the forward end of the horizontal lever arm to the axle through a trunnion lying crosswise of the axle is of great importance, since it avoids the transmission of any twisting tendency to the lever arm under rising and falling movements of either end of the axle. Such movements, of course, occur in small arcs, but the only movement transmitted to the lever arm by the axle is a straight vertical movement.

By curving the upwardly extending arm of the lever forwardly, the total length of the system is shortened, as compared with the use of a straight lever arm, and at the same time space is provided for the pivoting of the rear end of the upper or compression member of the lever arm vertically above the fulcrum of the lower or tension member.

By giving to the rigid forward portion 37 of the horizontal lever arm represented by the parts 35 and 37 the form shown in Figs. 3 and 5, ample space is provided beneath the member 37 for the maximum play of the transverse steering rod, the extreme positions of which are represented by the dotted circles $r$ and $r'$. This construction thus makes the system applicable to existing chassis structures without presenting any interference with the steering gear. Again, the twin plate construction of the upwardly extending lever arm 28 combines a high degree of strength and rigidity with relatively light weight.

The mechanism for supporting the rear portion of the chassis frame on the rear axle housing is generally quite similar to that hereinabove described; but, owing to the fact that the rear axle housing, at the points where the rear springs are commonly attached, is round, obviates the necessity of employing the compound lever arm shown and described in connection with the front axle to prevent tilting or rocking of the rear axle under the vertical swinging movements of the long lever arms.

Referring to Figs. 4, 11, 12 and 13, the rear bracket plates 14 are connected and spaced by a tubular bar $15^a$ and spacing sleeve $16^a$ similar to the tubular bar 15 and spacing sleeve 16 between the forward brackets, and equipped with the same automatic features for effecting constant lubrication of the fulcrum bearings $15^b$. On each of these bearings is journaled an elbow forging comprising a solid upwardly extending arm 88 formed with a forked upper end 88' (Fig. 11) and a rearwardly extending stem or shank member 89 (Fig. 4) preferably of round cross-section, adapted to have a tight fit in the forward end of a tubular arm section 90. The rear end of the arm 90 is tapped to receive a tubular trunnion 91 (Fig. 12) which has a journal bearing within a square block or axle fitting 92 which underlies the axle housing 93 crosswise of the latter, and is suspended from said axle housing by a collar 93' turnable on the housing and a pair of U-bolts 94 hung over the collar, and a clamp plate 95. The outer end of the trunnion 91 is closed and locked by a flanged plug 96 having an axial duct 97 closed by a cap 98 adapted for the supply of grease to the interior of the trunnion 91 and the tubular arm section 90. The body of grease is pressed rearwardly by a sliding plunger 99 (Fig. 4) in the arm 90 backed by a thrust spring 100 footed against the end of the stem 89; the grease passing to the bearing through radial ports 101 in the trunnion 91. The rear spring cylinder and spring, the spring-adjusting attachment of the cylinder to the chassis frame, and the plunger-rod connections to the upper forked end of the arm 88 are identical with the corresponding parts previously described.

In the case of the rear brackets 14, the holding effect of the bolts 12 may be reinforced either by auxiliary bolts underlying the frame bar 10, as in the case of the forward brackets 13, or, as shown in Fig. 11, by internal shoulder lugs 14' on the bracket plates 14 lying in contact with the lower side of the frame bar 10.

In Fig. 7 I have illustrated a somewhat simpler structure of lever fulcrums, which omits the tubular cross-bar 15 and spacing sleeve 16, and substitutes therefor a plain pivot bolt 150 individual to each of the brackets. The construction employing the cross-bar and spacing sleeve is preferred, however, on account of both the self-lubricating feature and the mutual lateral reinforcement of the brackets afforded by the spacing sleeve. The latter construction also permits the ready removal of the cross-bar and spacing sleeve whenever required by simply removing one of the flanged nuts from the end of the spacing bar and withdrawing the latter.

From the foregoing it will be seen that, since the collar 93' and suspension bolts 94 carrying the rear end of the horizontal lever arm are free to turn on the axle housing 93, the slight turning movement of said collar and bolts is free to take place without imparting any sidewise tilting or rocking strain to the axle housing. It will also be observed that by reason of the pivot formed by the trunnion 91 and its bearing, independent rising and falling movements of the ends of the rear axle housing in arcuate paths can take place without transmitting any twisting strain to the lever arm and its fulcrum. This last mentioned feature, which is embodied in both the front and rear lever connections to the front and rear axles, is of large practical importance, since otherwise excessive up and down swinging movements of the wheels would impose severe stress and possible breakage upon the fulcrums of the levers.

It will be observed that in the construction shown and described the entire supporting structure on each side is located beneath and in the vertical plane of the chassis side frame bar, as in the present standard spring construction, thus involving for its application no decrease in the width of the car body or increase in the width of the car wheel tread.

It will also be observed that the parts are so proportioned that, under the weight of the loaded car body, the lever fulcrums lie substantially in the horizontal plane of the axles, and there is an approximate four to one ration of the length of the horizontal lever arms to the length of the vertical arms. As a result of these features, up and down vibrations of the axles occur in arcs of very slight curvature, and at the same time ample space is provided without danger of bumping.

Again, the pivotal joining of many of the connecting parts throughout the entire structure secures great flexibility of movement throughout, and automatic accommodation to up and down, fore and aft, and sidewise vibrations of frame and axles without imposing any bending or twisting strains on the load-carrying elements of the structure as a result of such vibrations.

Again, by making the main members of the horizontal lever arms tubular, a desirable combination of lightness and strength is obtained, and also the described provisions for effecting automatic lubrication, with periodic renewal of the lubricant only at long intervals, are afforded.

Finally, the described structure, by reason of a multiplication of the weight of the load in the stress transmitted to the springs, and the transmission of the fulcrum and thrust stresses in directions substantially lengthwise of the car, insures the practical absorption of the vibrations caused by irregularities and unevenness in the road surface, and the elimination of all excessive vertical vibrations in the car body.

I claim—

1. An antivibration support for vehicles, comprising in combination a bracket secured to and extending below a side frame bar of the vehicle, an elbow lever pivoted at its elbow on said bracket substantially in the horizontal plane of an axle of the vehicle, said lever formed with an arm connected at its free end to said axle and with an upwardly extending arm, a second bracket secured to and extending below said frame bar, a cylinder pivoted at one end on said second bracket, a coil spring in said cylinder, and a plunger for tensioning said spring having its stem pivoted to said upwardly extending lever arm.

2. An antivibration support for vehicles, comprising in combination a bracket secured to and extending below a side frame bar of the vehicle, an elbow lever pivoted at its elbow on said bracket substantially in the horizontal plane of an axle of the vehicle, said lever formed with relatively long and short horizontally and vertically extending arms, means for attaching the free end of said long arm to said axle, a second bracket secured to and extending beneath said frame bar, a cylinder pivoted at one end on said second bracket, a coil compression spring in said cylinder, a plunger bearing against one end of said spring, and a plunger rod pivoted to said short lever arm.

3. An antivibration support for vehicles, comprising in combination a pair of bracket plates secured respectively to and extending below the sides of a side frame bar of the vehicle, an elbow lever pivoted at its elbow in and between said bracket plates substantially in the horizontal plane of an axle of the vehicle, said lever formed with relatively long and short horizontally and vertically extending arms both underlying said side frame bar, means for attaching the free end of said long arm to said axle, a second pair of bracket plates secured respectively to the sides of said frame bar and extending beneath the latter, a cylinder pivoted at one end to and between said last-named bracket plates, a coil compression spring in said cylinder, a plunger bearing against one end of said spring, and a plunger rod pivoted to said short lever arm.

4. An antivibration support for vehicles, comprising in combination a bracket secured to and extending below a side frame bar of the vehicle, a lever arm comprising parallel tension and compression members pivoted at one end to said bracket and an extension member pivoted to the other ends of said tension and compression members and itself attached to an axle, an upwardly extending lever arm rigid with one of said tension and compression members, and a spring opposing swinging movement of said upwardly extending arm.

5. An antivibration support for vehicles, comprising in combination a bracket secured to and extending below a side frame bar of the vehicle, a lever arm comprising parallel tension and compression members pivoted at one end to said bracket and an extension member pivoted to the other ends of said tension and compression members and itself attached to an axle, an upwardly extending lever arm rigid with said tension member, and a spring opposing swinging movement of said upwardly extending arm.

6. An antivibration support for vehicles, comprising in combination a bracket secured to and extending below a side frame bar of the vehicle, a lever arm comprising parallel tension and compression members pivoted at one end in a vertical transverse plane to said bracket and an extension member pivoted in a vertical transverse plane to the other ends of said members, an upwardly extending arm rigid with said tension member and curved to pass and at its upper end overhang the pivot connection of the compression member to the bracket, a spring anchored at one end to said frame bar, and a tensioning member for said spring pivotally connected to said overhanging upper end.

7. An antivibration support for automobiles, comprising in combination, a bracket secured to and extending below a side frame bar of the vehicle, a lever arm comprising upper and lower compression and tension members respectively pivoted at one end in a vertical transverse plane to said bracket and an extension member pivoted in a vertical transverse plane to the other ends of said members and overlying and affording clearance for a steering rod, an upwardly extending arm rigid with said tension member and comprising a pair of parallel spaced plates curved to pass and at their upper ends overhang the pivot connection of the compression member to the bracket, a spring pivotally anchored at one end to said frame bar, and a thrust member for said spring pivotally connected to and between the upper ends of said plates.

8. An antivibration support for vehicles, comprising in combination a bracket secured to and extending below a side frame bar of the vehicle, a relatively long horizontally extending lever arm comprising parallel upper and lower compression and tension members respectively pivoted at one end to said bracket and a rigid axle-supported member formed with a downwardly offset end portion to which the other ends of said compression and tension members are pivoted in a vertical transverse plane, a relatively short upwardly extending lever arm rigid with said tension member, and a spring opposing swinging movement of said upwardly extending arm.

9. In an antivibration support for vehicles, the combination of a bracket attached to and extending below a side frame member of the vehicle, an elbow lever fulcrumed at its elbow on said bracket and formed with an upwardly extending arm and a horizontally extending arm, a trunnion connected to said horizontally extending arm by means converting the swinging movements of said arm into vertical bodily rising and falling movements of said trunnion, a trunnion bearing attached to and crosswise of an axle of the vehicle, and a spring anchored to said side frame member and forming a thrust abutment for said upwardly extending lever arm.

10. In an antivibration support for vehicles, the combination of a bracket depending from a side frame member of the vehicle, an elbow lever fulcrumed at its elbow on said bracket and having a horizontally extending arm supported at its free end by an axle of the vehicle and an upwardly extending arm, a cylinder, a compression spring in said cylinder footed against the rear cylinder head, a plunger abutting against said spring, a plunger rod pivoted to said upwardly extending lever arm, and an extensible and contractible connection between said rear cylinder head and said side frame member.

11. In an antivibration support for vehicles, the combination of a bracket depending from a side frame member of the vehicle, an elbow lever fulcrumed at its elbow on said bracket and having a horizontally extending arm supported at its free end by an axle of the vehicle and an upwardly extending arm, a cylinder, a coil compression spring in said cylinder footed against the rear cylinder head, a plunger abutting against said spring, a plunger rod pivoted to said upwardly extending lever arm, a threaded rod connected at its rear end to said frame member and extending through said rear cylinder head, and an adjusting nut on said rod rotatably mounted in said rear cylinder head.

12. In a sub-frame spring support for vehicles, the combination with laterally opposed lever fulcrum brackets depending from the longitudinal side bars of the vehicle frame, of a tie bar extending between and connecting the lower portions of said brackets, the end portions of said tie bar serving as lever fulcrums, and a spacing sleeve mounted on said tie bar with its ends abutting against the inner sides of said brackets.

13. A specific form of claim 3, wherein the tension member of the lever arm is made tubular and is equipped with a spring-pressed plunger adapted to force lubricant therethrough to the pivot bearing of said member on the extension member.

14. A specific form of claim 3, wherein the compression member of the lever arm is made tubular and is equipped with a spring-pressed plunger adapted to force lubricant therethrough to the pivot bearing of said member on the extension member.

15. A specific form of claim 3, wherein both the tension and compression members of the lever arm are made tubular and are equipped with spring-pressed plungers adapted to force lubricant therethrough to the pivot bearings of said members on the extension member.

16. In an antivibration support for vehicles, the combination of a bracket attached to and extending below a side frame member of the vehicle, an elbow lever fulcrumed at its elbow on said bracket and formed with an upwardly extending arm and with a horizontally extending arm terminating in a trunnion, a trunnion bearing attached to and crosswise of an axle of the vehicle, said trunnion being formed with a longitudinal duct ported to the trunnion bearing and said horizontally extending arm including a tubular portion communicating with said duct and equipped with a spring-pressed plunger adapted to force lubricant therethrough, and a spring anchored to said side frame member and forming a resilient abutment for said upwardly extending lever arm.

17. In an antivibration support for vehicles, the combination of a bracket depending from a side frame member of the vehicle, an elbow lever fulcrumed at its elbow on said bracket and having a horizontally extending arm connected at its free end to an axle of the vehicle and an upwardly extending arm, a cylinder attached to said side frame member, a compression spring in said cylinder, a plunger abutting against said spring, a plunger rod pivoted to said upwardly extending lever arm, said plunger rod being formed with a longitudinal duct ported to the pivot bearing of said rod to permit the flow of lubricant from said cylinder to said bearing, and means for adjusting the tension of said spring to the load of the vehicle.

18. In an antivibration support for vehicles, the combination of a bracket depending from a side frame member of the vehicle, an elbow lever fulcrumed at its elbow on said bracket and having a horizontally extending arm supported at its free end by an axle of the vehicle and an upwardly extending arm, a cylinder, a coil compression spring in said cylinder footed against the rear cylinder head, a plunger abutting against said spring, a plunger rod pivoted to said upwardly extending lever arm, a threaded rod connected at its rear end to said frame member and extending through said rear cylinder head, said plunger rod and said threaded rod being formed with longitudinal ducts to conduct lubricant from the cylinder to the end bearings of said rods, and an adjusting nut on said rod rotatably mounted in said rear cylinder head.

19. In an antivibration support for vehicles, the combination of a bracket depending from a side frame bar of the vehicle, a rear axle housing, an elbow lever fulcrumed at its elbow on said bracket and having an upwardly extending arm and a rearwardly extending arm terminating in a trunnion, a bearing member for said trunnion so mounted on the rear axle housing as to swivel crosswise of the latter, said trunnion having a longitudinal bore ported to said trunnion bearing and said rearwardly extending arm having a tubular portion communicating with the bore of said trunnion, a spring-pressed plunger in said tubular portion adapted to force lubricant to said trunnion bearing, and a spring opposing swinging movement of said upwardly extending arm.

20. In a sub-frame spring support for vehicles, the combination with laterally opposed brackets depending from the longitudinal side bars of the vehicle frame, of a tubular tie member extending between and connecting the lower portions of said brackets, said tie member also having shoulders abutting against the inner sides of said brackets whereby it serves as a strut, and the end portions of said tie member constituting lever fulcrums and being laterally ported, and spring-pressed plungers within said tie member adapted to force lubricant through the lateral ports of said fulcrum end portions.

21. In an antivibration support for vehicles, the combination of a bracket attached to and extending below a side member of the vehicle, an elbow lever fulcrumed at its lower end on said bracket and formed with an upwardly extending arm and with a horizontally extending arm, means connecting the free end of said horizontally extending arm to an axle of the vehicle permitting endwise tilting of said axle without transmitting twisting strain to said horizontally extending arm and while the distance between the axes of the axle and fulcrum of said elbow lever remain constant, the last said means embodying a collar loose upon the axle, a bearing member fastened to and beneath said collar, one end of the horizontal arm of the lever being loosely journaled in said bearing on an axis transverse to the axis of the collar, and a spring anchored to said side frame member and opposing swinging movement of said upwardly extending arm.

22. In an antivibration support for vehicles, the combination of a bracket attached to and extending below a side frame member of the vehicle, an elbow lever fulcrumed at its elbow on said bracket and formed with an upwardly extending arm and with a horizontally extending arm terminating in a trunnion, a trunnion bearing attached to and crosswise of the axle of the vehicle, and rotatable in a direction about the axle, the distance between the axes of said trunnion bearing and said elbow lever being at all times maintained constant, and a spring anchored to said side frame member and forming a resilient abutment for said upwardly extending lever arm.

ALBERT HUPP.